(12) United States Patent
Eybergen et al.

(10) Patent No.: US 7,621,263 B2
(45) Date of Patent: Nov. 24, 2009

(54) SUPERCHARGER DRIVE SYSTEM

(75) Inventors: William Nicholas Eybergen, Windsor (CA); Daniel Robert Ouwenga, Royal Oak, MI (US); Christopher Wayne Creager, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 161 days.

(21) Appl. No.: 11/513,790

(22) Filed: Aug. 31, 2006

(65) Prior Publication Data

US 2008/0053417 A1 Mar. 6, 2008

(51) Int. Cl.
 *F02B 33/00* (2006.01)
(52) U.S. Cl. ............... 123/559.3; 123/559.1; 192/48.92
(58) Field of Classification Search .............. 123/559.1, 123/559.3; 192/45.1, 45, 48.92
 See application file for complete search history.

(56) References Cited

U.S. PATENT DOCUMENTS

| | | | | |
|---|---|---|---|---|
| 1,990,306 A | * | 2/1935 | Nardone ................... | 123/559.3 |
| 3,832,914 A | * | 9/1974 | Pinfield ................... | 192/48.92 |
| 4,145,888 A | * | 3/1979 | Roberts ...................... | 60/608 |
| 4,445,337 A | * | 5/1984 | McCreary ................... | 60/608 |
| 4,519,373 A | * | 5/1985 | Hardy et al. ............. | 123/559.3 |
| 4,549,638 A | * | 10/1985 | Johnston ....................... | 192/45 |
| 4,724,940 A | * | 2/1988 | Lederman .................... | 192/45 |
| 4,821,856 A | * | 4/1989 | Lederman .................... | 192/45 |
| 4,828,086 A | * | 5/1989 | Lederman .................... | 192/45 |
| 4,875,454 A | * | 10/1989 | Okimoto et al. .......... | 123/559.3 |
| 4,927,333 A | * | 5/1990 | Kato .......................... | 417/316 |
| 4,986,402 A | * | 1/1991 | Neuwirth et al. ............. | 192/45 |
| 5,133,188 A | * | 7/1992 | Okada ......................... | 60/609 |
| 5,289,813 A | * | 3/1994 | Adachi et al. ............ | 123/559.3 |
| 6,082,340 A | * | 7/2000 | Heimark ................... | 123/559.1 |
| 6,289,882 B1 | | 9/2001 | Slicker | |
| 6,375,442 B1 | | 4/2002 | Ward et al. | |
| 6,609,505 B2 | * | 8/2003 | Janson .................... | 123/559.1 |
| 6,634,344 B2 | | 10/2003 | Stretch | |
| 6,758,661 B1 | | 7/2004 | Thelen | |
| 2002/0096156 A1 | * | 7/2002 | Palazzolo et al. ........ | 123/559.1 |
| 2005/0087417 A1 | * | 4/2005 | Shimomura et al. .......... | 192/45 |

* cited by examiner

*Primary Examiner*—Thomas E Denion
*Assistant Examiner*—Mary A Davis
(74) *Attorney, Agent, or Firm*—Dykema Gossett PLLC

(57) ABSTRACT

A supercharger drive system that includes a shaft connected to a set of gears; a one-way clutch provided for connection to the shaft; and an actuation controller in communication with the one-way clutch. In an embodiment, the one-way clutch can disengage and rotors or impellers associated with the system are permitted to rotate independently of the one-way clutch.

21 Claims, 4 Drawing Sheets

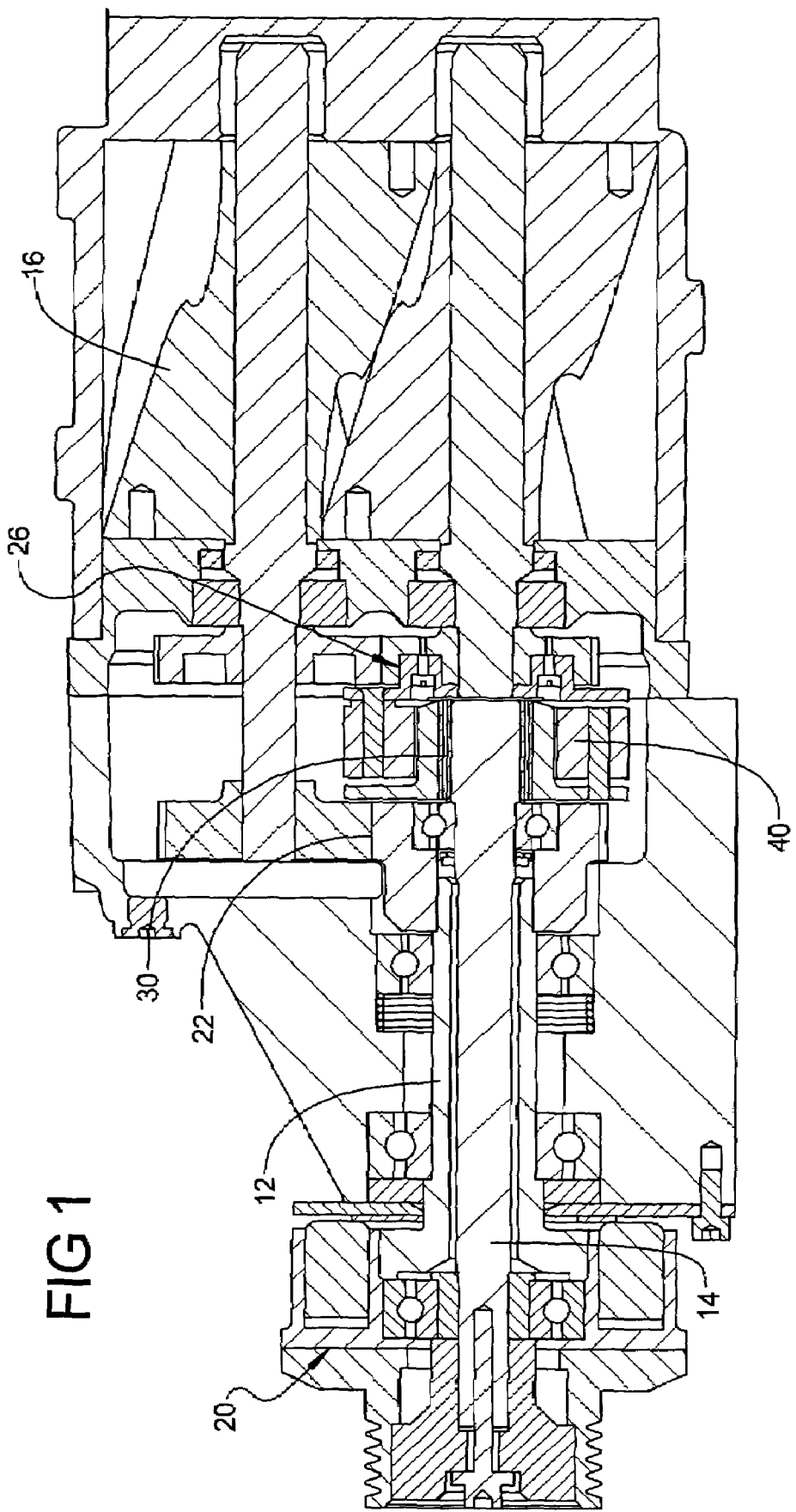

SUPERCHARGER DRIVE SYSTEM

TECHNICAL FIELD

The present invention relates generally to a supercharger drive system, including a supercharger drive system utilizing a one-way clutch.

BACKGROUND

The use of a supercharger to increase or "boost" the air pressure in an intake manifold of an internal combustion engine to result in an engine having a greater horsepower output capability is known. To pressurize the air, a supercharger must spin rapidly—generally more rapidly than the engine itself. Typically this is accomplished by providing a crankshaft or drive pulley that is larger than the supercharger or driven pulley.

An accessory belt can be used to, among other things, drive a positive displacement supercharger that rotates at a fixed ratio with respect to engine crankshaft rpm. A supercharger pulley rotates at speeds that are generally physically defined by the ratio between the supercharger pulley and an engine crankshaft pulley. As such, supercharger pulley revolutions per minute (rpm) is defined by an engine rpm pulley ratio. Generally, the maximum rpm of a supercharger must not be exceeded throughout the entire engine rpm range. Moreover, the maximum value is commonly used to define the largest ratio that can be achieved with a fixed ratio pulley size, which can limit the amount of airflow that can be provided in a lower rpm range of an engine.

Generally, supercharger volume airflow is based upon: supercharger displacement (volume per revolution), volumetric efficiency (percent of displaced volume filled every revolution), and rotor rpm. However, for some applications, a two-speed drive system can be used to provide a different supercharger-to-engine rpm ratio for use in the lower rpm range of an engine. Among other things, a two-speed system permits two supercharger rotor speed selections for each supercharger pulley rpm value. Such a system can provide, inter alia, more airflow and more engine torque without requiring a supercharger constructed for a larger displacement. Further, for some applications, a two-speed drive system can provide improved performance in a lower rpm range, while maintaining a standard performance in the higher rpm range, and while still not exceeding maximum supercharger rpm. Moreover, with two different ratios available, a supercharger can provide gear ratios and supercharger shift points that may be better optimized for a particular engine design to provide desirable power characteristics.

SUMMARY

According to an aspect of the invention, a supercharger drive system, is provided that includes a shaft connected to a set of gears; a one-way clutch provided for connection to the shaft; and an actuation controller in communication with the one-way clutch. In an embodiment, the one-way clutch can disengage and rotors or impellers associated with the system are permitted to rotate independently of the one-way clutch.

BRIEF DESCRIPTION OF THE DRAWINGS

Embodiments of the invention will now be described, by way of example, with reference to the accompanying drawings, wherein:

FIG. 1 is side cross-sectional drawing of a supercharger drive system according to an embodiment of the invention.

DETAILED DESCRIPTION

Figure 2A:
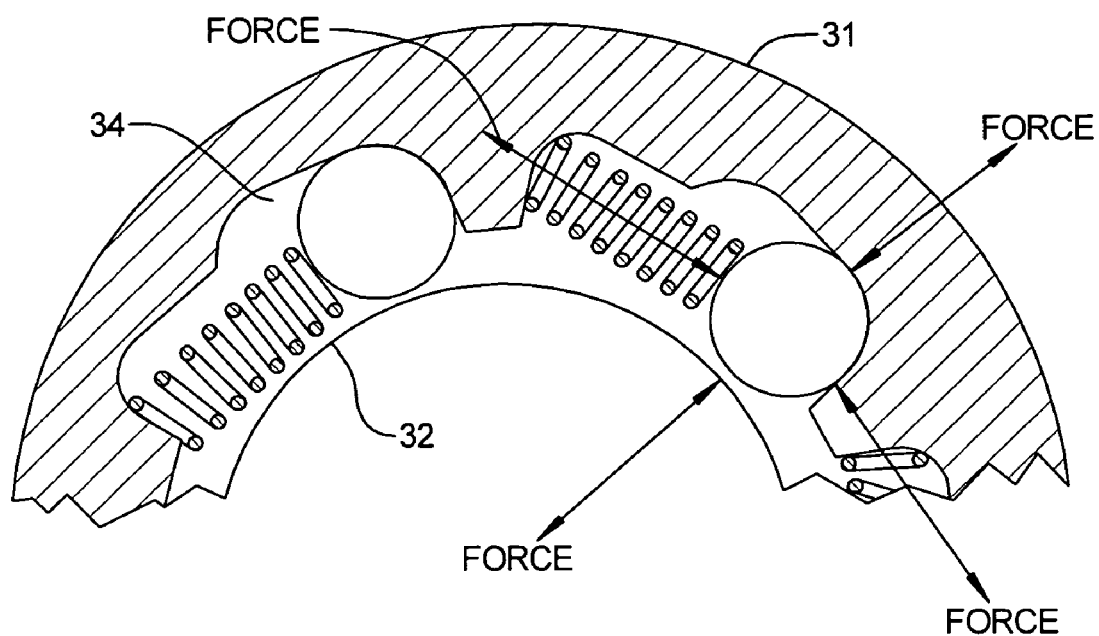
FIG. 2a illustrates a partial segment of an embodiment of a one-way clutch.

Reference will now be made in detail to embodiments of the present invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

A supercharger drive system with embodiments of the present invention is shown in FIG. 1. As shown in the illustrated embodiment, the system may include an outer shaft 12 and an inner shaft 14, each with a different gear ratio for connection with associated impellers or rotors 16. In an embodiment of the invention, the outer and inner shafts 12,14 may be provided in the form of concentric shafts, each shaft working with a different gear and gear ratio with respect to the impellers or rotors.

In the illustrated embodiment, the outer shaft 12 transfers torque between an actuation controller (e.g., an electromagnetic clutch 20) and an increased gear, or step-up gear 22. A coupling included in the system is generally identified as element 40. The step-up gear 22 can, for example, have a gear ratio range that extends from about 1.1:1 to about 2.0:1. Further, the actuation controller may comprise an electromagnetic clutch, a hydraulic clutch, or other device that provides a user with control over when engagement of the increased gear occurs (which may be user/system controlled actuation).

The production ratio associated with the system can be chosen based upon desired power characteristics for an engine. In general, higher step-up gear ratios typically provide a larger airflow between two speeds. As such, engine performance may have too large of a variation, i.e., a large noticeable loss of engine torque during shift. Higher overrun speed of the one-way clutch can decrease component life. Lower step-up gear ratios typically provide lower airflow between two speeds. There is less performance difference, but also less engine torque variation. A lower overrun speed associated with the one-way clutch typically results in longer component life.

The inner shaft 14 transfers torque between a pulley, which is connected to the shaft, and a 1:1 gear 26, i.e., a gear having a substantially 1:1 gear ratio. In an exemplary embodiment, upon engagement of an electromagnetic (or EM) clutch 20, the step-up gear 22 is used to drive the impellers or rotors 16. The EM clutch 20 may, for example and without limitation, provide a 50N-m torque transfer; engage in 40-50 milliseconds or less, use automotive voltage (12v), and may be configured so as to only be engaged during a "step-up" ratio. Further, the engagement of an appropriate clutch can ensure that both outer and inner shafts 12, 14 rotate at equal (or substantially equal) rpm. That is, the outer shaft 12, which is connected to the 1:1 gear 26, rotates at a lower rpm than the step-up gear 22 that it drives during EM clutch engagement.

The differential speed between the 1:1 gear 26 and the step-up gear 22 can be addressed by the inclusion of a one-way clutch 30. A one-way clutch permits the 1:1 gear 26 to be "disconnected" and allows the supercharger to be driven at a higher rotational speed than the 1:1 gear 26 can provide. Further, the one-way clutch may, by way of example and without limitation, be provided in several different forms or variations. For example, the one-way clutch may be a roller-type ("roller" or "roller ramp") clutch, which utilizes a plurality of rollers as the clutch mechanism. Moreover, as further described hereinafter, the associated ramps may be located on an inner race or an outer race. Other known one-way clutch technologies that may be employed include, without limitation, cam clutches, sprag clutches, and mechanical diode clutches.

Figure 2B:
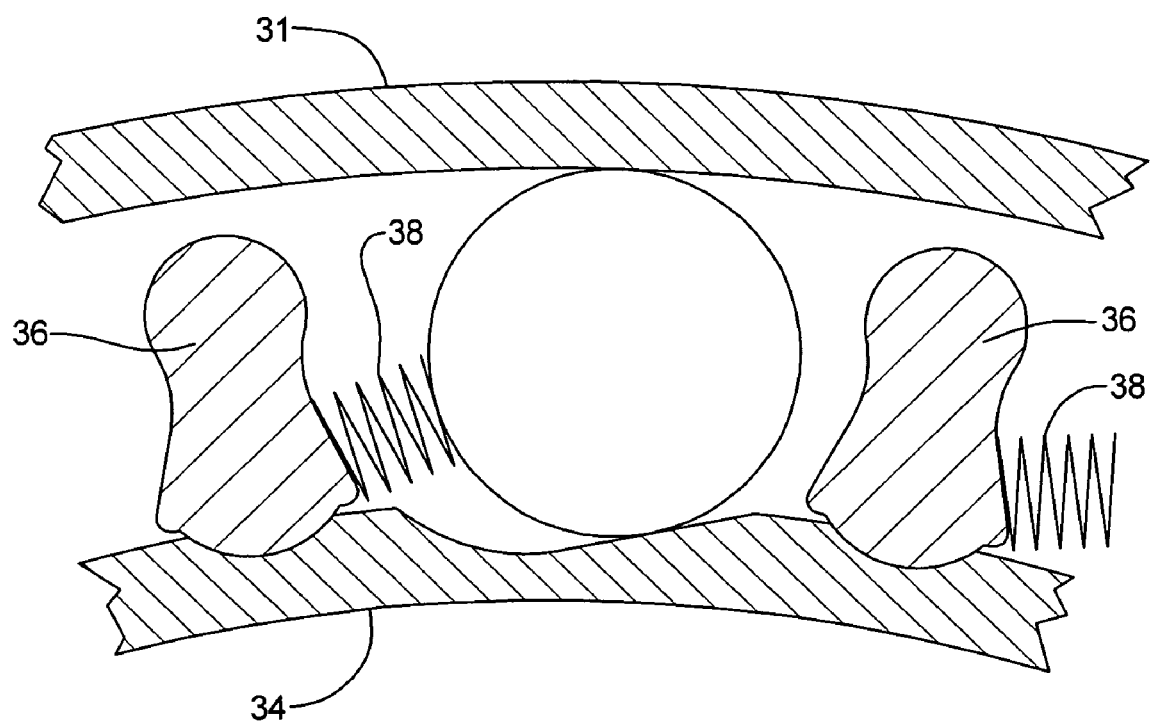
FIG. 2b illustrates a partial segment of another embodiment of a one-way clutch.

Again, a number of one-way clutches are conventionally available and potentially usable in connection with embodiments of the present invention. Such one-way clutches need to be able to uncouple and couple, as desired, at the anticipated rotational speeds and in the context of the present invention. By way of further example, FIGS. 2a and 2b represent examples of roller clutches. A generic example of a first type of one-way roller clutch design is generally represented, in part, in FIG. 2a. Such a design may include a ramp 34 on an outer race 31. By way of example, and without limitation, a generic example of a second type of one-way roller clutch design is generally represented, in part, in FIG. 2b. With the second configuration, ramp 34 can, for instance, be provided on the inner race 32. Moreover, some configuration, such as those illustrated, may further include cages 36 and springs 38. Moreover, the anticipated or intended centrifugal forces associated with a given supercharger application can, at least in part, determine which type of roller clutch (or other design) may be appropriate for such application.

Once the EM clutch 20 is disengaged, the one-way clutch 30 can engage, and the power direction can be transferred to the 1:1 gear 26. The shift to the 1:1 gear/ratio prevents the supercharger from spinning faster than the desired or intended limit. Moreover, the engine can consume less power and, the low speed is ideal for part throttle acceleration or steady state cruising by reducing the amount of energy being used to spin the supercharger.

The 1:1 gear 26 also drives the outer shaft 12 at an rpm that is reduced by the step up gear/ratio. For a given rotational rpm, the faces of the EM clutch can rotate at the step-up gear/ratio rpm differential. Having the two faces of the one-way clutch rotating at a small rpm differential can help prevent large inertial acceleration loads when the EM clutch is engaged.

By way of example, without limitation, at relatively low (e.g., 1500 rpm) engine speed, it may be desirable for the supercharger system to provide an increased airflow. An embodiment of the invention, such as generally described herein, permits the systems to disengage the 1:1 gear, thereby allowing the system to be driven at a higher (stepped-up) rotational speed to supply increased airflow. Then, when desired, the system can force or permit the re-engagement of the 1:1 gear to drop down to "normal" levels (in which a 1:1 gear ration is more desirable).

The following is an example of operational steps associated with a system according to an embodiment of the invention. An engine is provided that rotates at a given rpm value. A user or system-supplied signal (e.g., a 12-volt input) is provided to an actuation controller (e.g., an electromagnetic clutch). The actuation controller engages and "locks" a first (e.g., inner) and second (e.g., outer) shaft together. That is the rpm values for both shafts are substantially equivalent. The system is now said to be in a high-speed or step-up ratio. The torque transfer path from the pulley is as follows: (a) actuation controller (e.g., EM clutch), outer shaft, step-up gears (e.g., 1.3:1, increasing the rotational speed of the rotorshaft), extended rotorshaft (if present), rotor timing gears (e.g., 1:1 gear/ratio), and supercharger rotors or impellers. The rotors or impellers are then rotating at a pulley rpm step-up ratio. The first (e.g., inner) shaft is rotating at pulley rpm, while the rotors/impellers are rotating at pulley rpm step-up. The one-way clutch has a speed differential between its inner and outer races where it has an inner race is connected to a first (e.g., inner) shaft, and it has an outer race connected to a second (e.g., outer) shaft connected to a 1:1 gear. Such a condition is considered to be "overrunning" for the one-way clutch. In such a condition, no torque is being transmitted through the one-way clutch and no NVH or other benefits are typically seen.

When the user or system-provided signal is removed from the actuation controller, the actuation controller (e.g., EM clutch) can no longer transfer torque. The unit is then considered to be in a low-speed or 1:1 ratio, and the rotors/impellers slow down to generally match the new (1:1) gear ratio. However, the system is still connected to the second (e.g., outer) shaft and maintains second (outer) shaft rpm by 1:1 gear rpm; extended rotorshaft; step-up gears (e.g., an outer shaft speed can be controlled by pulley rpm divided by step-up gear ratio (e.g., pulley rpm/1.3); second (outer) shaft; and the back of the EM clutch is rotating at second (outer) shaft speed while the front of the EM clutch is rotating at pulley speed. The process can then be repeated by supplying a signal to the actuation controller (e.g., EM clutch).

In a very general sense only, aspects of the system can be analogized to a bicycle. As a user peddles faster to accelerate and then stops peddling, the rear tire is permitted to continue to rotate even though the pedals are no longer rotating. With such an analogy, the pedals generally equate to an engine and the rear tire generally equates to a supercharger.

Figure 3:
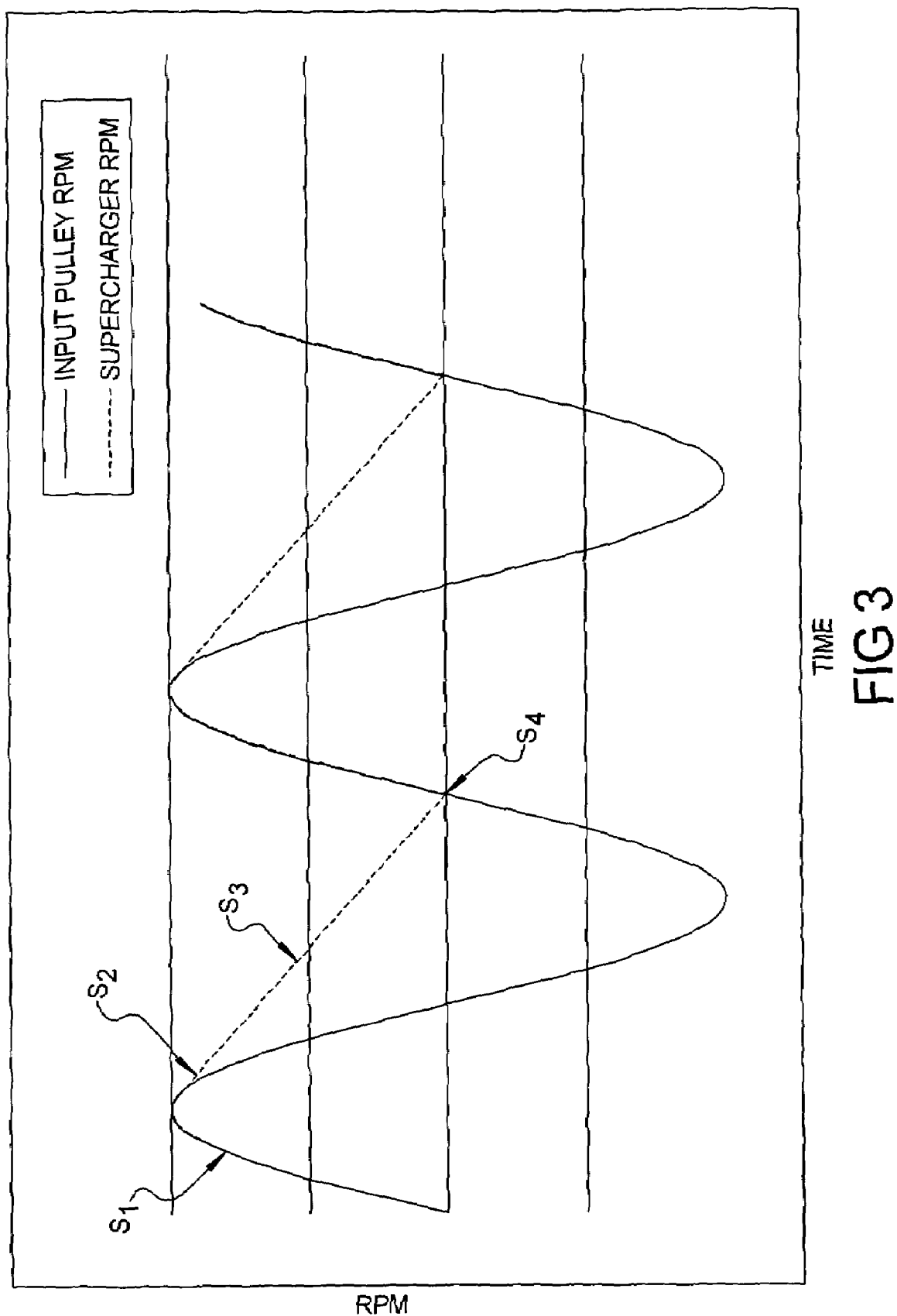
FIG. 3 is a graph illustrating an rpm performance profile for a supercharger relative to an input pulley.

The graph associated with FIG. 3 generally illustrate an rpm performance profile for a supercharger drive system including a one-way clutch relative to an input pulley. At the segment designated $S_1$, the supercharger increases rpm along with the input pulley as the engine increases rpm. At or about the position on the profile labeled $S_2$, the engine slows rapidly, the supercharger continues to spin at its current rpm (i.e., the one-way clutch disengages and "overruns" momentarily). Along the segment generally identified as $S_3$, the supercharger decreases in speed due to load and friction, not engine deceleration. At or about point $S_4$ on the profile, once the pulley rotational speed matches the supercharger rotational speed, the one-way clutch re-engages and accelerates along with the engine (and associated pulley).

The inclusion of a one-way clutch in the supercharger system can, among other things, reduce associated noise, vibration, and harshness (i.e., NVH). For example, use of a one-way clutch can reduce the transmission of rotational oscillations to the supercharger gears, thereby reducing engine idle gear rattle noise. Rotational oscillations from the engine, at engine firing frequency, are transmitted through the accessory belt to the supercharger, and thus to the supercharger gears.

It is noted that the majority of NVH-related benefits associated with a one-way clutch are primarily present only when the one-way clutch is transmitting torque (i.e., the EM clutch is disengaged), or, in a standard one-speed supercharger when the one-way clutch is connected between the rotors and the input shaft. For single-speed one-way clutch applications, discussed further herein, the location of the clutch could also be in the pulley or elsewhere along the input shaft.

Figure 4:
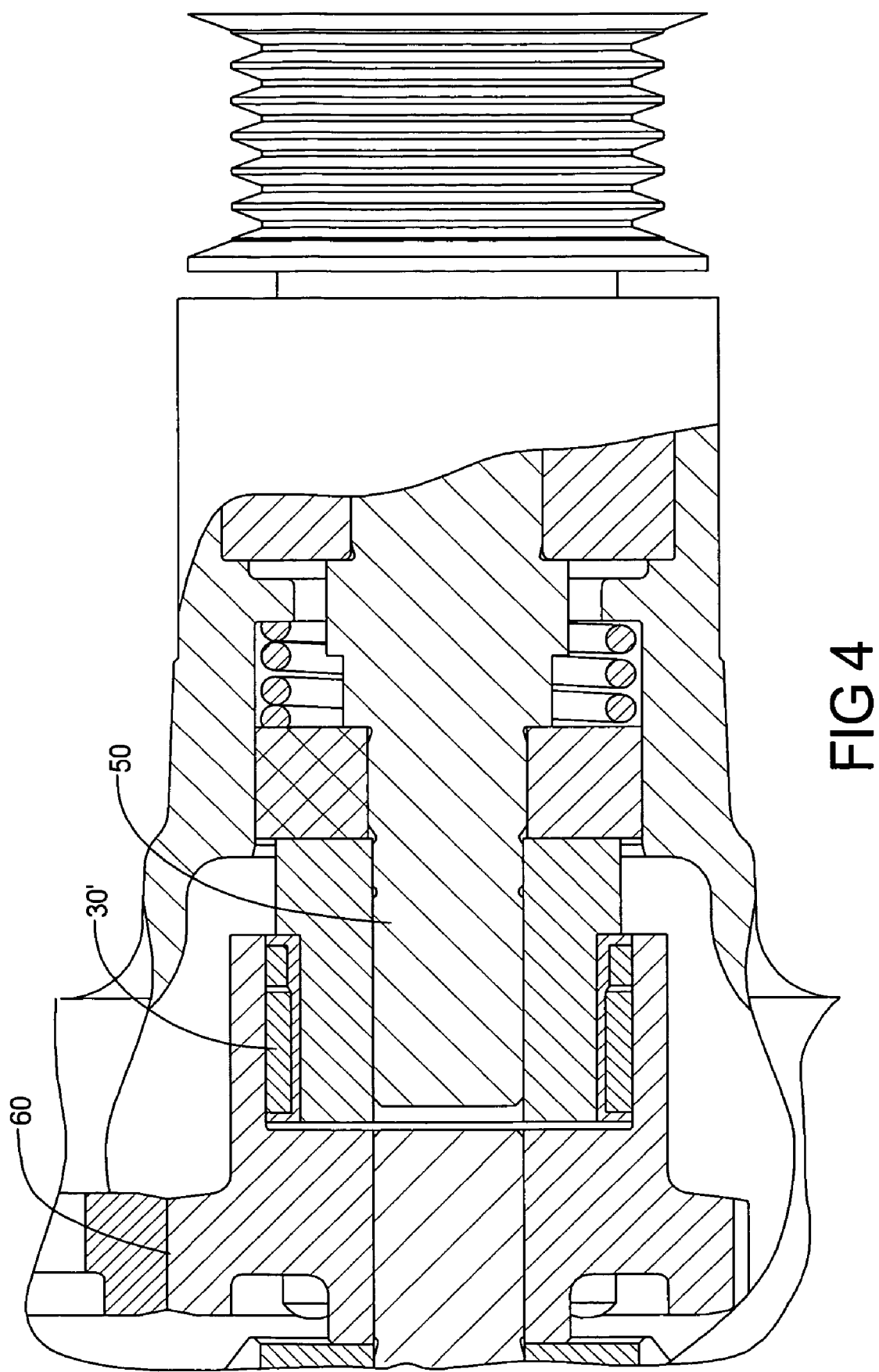
FIG. 4 is a is side cross-sectional drawing of a supercharger drive system according to another embodiment of the invention

FIG. 4 illustrates an embodiment of the invention, which is shown in a single-input shaft configuration, as opposed to the configuration previously illustrated in connection with a two-speed application. This alternative embodiment also employs a one-way clutch 30'. The illustrated embodiment may also include and employ an actuation controller (e.g., an electromagnetic clutch) such as previously described. However, in contrast to the previously-described two-speed configuration, in the illustrated embodiment there is no "outer" shaft. Moreover, the one-way clutch 30' can be provided, as illustrated, in connection with a straight input shaft 50. The input shaft 50, as illustrated, is employed in connection with timing gears 60. Also, as previously described, the one-way clutch 30' can be configured to be able to rotate or spin freely in one direction and not the other. Moreover, in accordance with the teachings of the present invention, for a number of conventional supercharger applications, an associated coupling can simply be replaced or augmented by an appropriate one-way clutch.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A two-speed supercharger drive system, comprising:
an actuation controller;
an outer shaft connected to the actuation controller and also connected to a step-up gear, the step-up gear provided for connection to a first rotor of the system;
an inner shaft connected to a one-way clutch, the one-way clutch connected to a second rotor of the system;
the outer shaft and inner shaft are concentric; and
wherein the one-way clutch is configured for disengagement when the second rotor associated with the system is permitted to rotate independently of the one-way clutch, and the system is driven at a higher rotational speed provided by the step-up gear to the first rotor that is controlled by the actuation controller, and further wherein the one-way clutch is configured for reengagement when the second rotor associated with the system is rotating at substantially the same speed and direction as an input pulley, and wherein reengagement of the one-way clutch is configured to occur at variable speeds of the input pulley.

2. The system as recited in claim 1, wherein the actuation controller is a device that provides control over when engagement of the step-up gear occurs.

3. The system as recited in claim 2, wherein the actuation controller is an electromagnetic clutch, hydraulic clutch, pneumatic clutch, or mechanically-actuated clutch.

4. The system as recited in claim 2, wherein the actuation controller is user-controlled.

5. The system as recited in claim 1, wherein the one-way clutch comprises a roller-type clutch, a cam clutch, a sprag clutch, or a mechanical diode clutch.

6. The system as recited in claim 1, wherein when the system receives a signal or an input that increased airflow is desired and is driven at a higher rotational speed provided by the step-up gear.

7. The system as recited in claim 1, wherein the one-way clutch includes a profile with a ramp and a plurality of rollers and springs.

8. The system as recited in claim 1, wherein a portion of the one-way clutch is spinning prior to engagement.

9. The system as recited in claim 1, the one-way clutch including a first bearing race and a second bearing race; wherein the one-way clutch rotates at substantially the same rpm as the outer shaft during engagement and, upon disengagement, one of the bearing races will continue to rotate at substantially the same rotational speed as the outer shaft, while the other race will rotate at substantially the same rotational speed as the first rotor.

10. The system as recited in claim 1, wherein the one-way clutch includes a ramp on an outer race of the one-way clutch.

11. The system as recited in claim 1, wherein the one-way clutch includes a ramp on an inner race of the one-way clutch.

12. A two-speed supercharger drive system, comprising:
an actuation controller;
an outer shaft connected to the actuation controller and also connected to a gear having a gear ratio greater than 1:1, the gear provided for connection to a first rotor of the system; and
an inner shaft connected to a one-way clutch, the one-way clutch connected to a second rotor of the system;
the outer shaft and inner shaft are concentric; and
wherein the one-way clutch is configured for disengagement when the second rotor associated with the system is permitted to rotate independently of the one-way clutch, and the system is driven at a higher rotational speed provided by the gear to the first rotor that is controlled by the actuation controller, and further wherein the one-way clutch is configured for reengagement when the second rotor rotors associated with the system is rotating at substantially the same speed and direction as an input pulley, and wherein reengagement of the one-way clutch is configured to occur at variable speeds of the input pulley.

13. The system as recited in claim 12, wherein the actuation controller is a device that provides control over when engagement of the gear occurs.

14. The system as recited in claim 13, wherein the actuation controller is an electromagnetic clutch, hydraulic clutch, pneumatic clutch, or mechanically-actuated clutch.

15. The system as recited in claim 13, further includes a second gear connected to the inner shaft, wherein when the system receives a signal or an input that increased airflow is desired, the second gear is disengaged and is driven at a higher rotational speed provided by the first rotor.

16. A supercharger drive system, comprising:
an actuation controller;
an outer shaft connected to the actuation controller and also connected to a set of gears, the set of gears having a gear ratio greater than 1:1, the gears provided for connection to a first rotor of the system; and
an inner shaft connected to a one-way clutch, the one way clutch provided for connection to a second rotor of the system;
the outer shaft and inner shaft are concentric; and
wherein the one-way clutch is configured for disengagement when the second rotor associated with the system is permitted to rotate independently of the one-way clutch and the system is driven at a higher rotational speed provided by the gears to the first rotor that is controlled by the actuation controller, and further wherein the one-way clutch is configured for reengagement when the second rotor associated with the system is rotating at substantially the same speed and direction as an input pulley, and wherein reengagement of the one-way clutch is configured to occur at variable speeds of the input pulley.

17. The system as recited in claim 16, wherein the actuation controller is a device that provides control over when engagement of the set of gears occurs.

18. The system as recited in claim 16, wherein the one-way clutch comprises a roller-type clutch, a cam clutch, a sprag clutch, or a mechanical diode clutch.

19. The system as recited in claim 16, wherein the system employs a single-input shaft configuration.

20. The system as recited in claim 16, wherein the one-way clutch includes a ramp on an outer race of the one-way clutch.

21. The system as recited in claim 16, wherein the one-way clutch includes a ramp on an inner race of the one-way clutch.

* * * * *